(12) United States Patent
Jeong

(10) Patent No.: US 8,746,467 B2
(45) Date of Patent: Jun. 10, 2014

(54) DISHWASHER

(75) Inventor: Heon Ho Jeong, Hwaseong-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 42 days.

(21) Appl. No.: 13/352,828

(22) Filed: Jan. 18, 2012

(65) Prior Publication Data

US 2012/0181242 A1 Jul. 19, 2012

(30) Foreign Application Priority Data

Jan. 19, 2011 (KR) .................. 10-2011-0005546

(51) Int. Cl.
| A47G 19/08 | (2006.01) |
| A47F 7/00 | (2006.01) |
| A47F 3/14 | (2006.01) |
| A47J 47/00 | (2006.01) |
| A47L 19/04 | (2006.01) |
| A47G 21/14 | (2006.01) |
| A47J 47/16 | (2006.01) |
| A47L 15/50 | (2006.01) |
| B25H 3/04 | (2006.01) |
| A47F 1/10 | (2006.01) |

(52) U.S. Cl.
CPC ............... A47L 19/04 (2013.01); A47G 21/14 (2013.01); A47J 47/16 (2013.01); B25H 3/04 (2013.01); A47F 2001/103 (2013.01); A47L 15/505 (2013.01); A47L 15/502 (2013.01)
USPC ...................... 211/41.8; 211/70.7; 211/126.2

(58) Field of Classification Search
CPC ........ A47G 21/14; A47J 47/16; A47J 43/287; A47L 19/04; A47L 15/505; A47L 15/50; A47L 15/501; A47L 15/502; A47L 15/503; A47L 15/507; A47L 19/00; B25H 3/04; A47F 2001/103; A47F 3/147; A47F 3/14; A47F 10/06; A47F 5/0031; A47F 5/0025; A47F 5/01; A47F 5/13; A47B 31/00; A47B 87/02; A47B 87/0207; A47B 87/0215; A47B 87/0223; A47B 87/0246; A47B 87/0253; A47B 87/0261; A47B 87/0269; A47B 87/0276
USPC ........... 211/70.7, 41.3, 41.8, 41.9, 41.5, 41.6, 211/85.25, 126.2, 126.7, 126.8, 126.11, 211/126.12, 85.13, 133.5, 181.1; 220/487, 220/488, 572, 23.6; D32/3, 55–59; 134/58 D, 56 D, 57 D; 312/301; 206/372, 509, 511, 518, 503, 553; 248/37.3, 37.6
See application file for complete search history.

(56) References Cited

U.S. PATENT DOCUMENTS

| 1,022,544 | A | * | 4/1912 | Goehr | .......................... 211/41.5 |
| 2,440,507 | A | * | 4/1948 | Geralds | .......................... 220/491 |
| 2,497,574 | A | * | 2/1950 | Bahnson | ..................... 242/130.3 |
| 4,008,543 | A | * | 2/1977 | Vilt | .............................. 47/1.01 R |
| 6,477,732 | B1 | * | 11/2002 | Cline et al. | ........................ 15/185 |

(Continued)

FOREIGN PATENT DOCUMENTS

WO 2011/006726 1/2011

*Primary Examiner* — Jennifer E Novosad
(74) *Attorney, Agent, or Firm* — Staas & Halsey LLP

(57) ABSTRACT

A dishwater includes a basket unit including an upper basket and a lower basket. The upper basket is separated from the lower basket so that cutlery in the upper basket is easily separated from the upper basket.

17 Claims, 14 Drawing Sheets

(56) References Cited

U.S. PATENT DOCUMENTS

| | | | |
|---|---|---|---|
| 6,634,510 B2* | 10/2003 | Larson et al. | 211/41.8 |
| 7,438,185 B2* | 10/2008 | Ho et al. | 206/509 |
| 7,543,712 B2* | 6/2009 | Purushothaman | 211/41.9 |
| 7,584,845 B2* | 9/2009 | Cheng | 206/376 |
| 7,682,465 B2* | 3/2010 | Anderson et al. | 134/56 D |
| 8,104,628 B2* | 1/2012 | Kim | 211/41.8 |
| RE43,635 E * | 9/2012 | Dunn et al. | 34/104 |
| 2002/0185166 A1* | 12/2002 | Rosenbauer et al. | 134/200 |
| 2003/0089672 A1* | 5/2003 | VanLandingham | 211/41.8 |
| 2005/0040120 A1* | 2/2005 | Pine et al. | 211/41.6 |
| 2005/0241686 A1* | 11/2005 | Woo | 134/135 |
| 2006/0108298 A1* | 5/2006 | Kim | 211/41.8 |
| 2006/0113260 A1* | 6/2006 | Purushothaman et al. | 211/41.8 |
| 2006/0243681 A1* | 11/2006 | Bastuji et al. | 211/41.8 |
| 2006/0250058 A1* | 11/2006 | Stevens et al. | 312/311 |
| 2007/0119801 A1* | 5/2007 | Miele et al. | 211/70.7 |
| 2007/0272632 A1* | 11/2007 | Jerstroem et al. | 211/41.4 |
| 2008/0156358 A1 | 7/2008 | Shin et al. | |
| 2008/0156362 A1 | 7/2008 | Shin et al. | |
| 2008/0272074 A1* | 11/2008 | Crookshanks et al. | 211/41.9 |
| 2009/0211994 A1* | 8/2009 | Yang et al. | 211/41.4 |
| 2009/0242495 A1* | 10/2009 | Moberg | 211/41.8 |
| 2010/0155280 A1 | 6/2010 | Graute et al. | |
| 2011/0108682 A1* | 5/2011 | Boaz et al. | 248/99 |
| 2013/0020268 A1* | 1/2013 | Domenech Grau | 211/41.8 |

\* cited by examiner (a) FIRST PIN     (b) SECOND PIN     (c) THIRD PIN

DISHWASHER

CROSS-REFERENCE TO RELATED APPLICATIONS

This application claims the benefit of Korean Patent Application No. 2011-0005546, filed on Jan. 19, 2011 in the Korean Intellectual Property Office, the disclosure of which is incorporated herein by reference.

BACKGROUND

1. Field

Embodiments of the present invention relate to a dishwasher.

2. Description of the Related Art

A dishwasher is an apparatus that sprays wash water to tableware, accommodated in a wash tub, to remove foreign matter from the tableware. Also, the dishwasher may sterilize the washed tableware.

A rack unit of the dishwasher may accommodate various kinds of tableware. The tableware may include, but is not limited to, cutlery—for example, table knives, forks, spoons, chopsticks, etc.—bowls, dishes and culinary tools—for example, kitchen knives, dippers, etc.

Various pins to support various kinds of tableware are provided at the rack unit. Various kinds of tableware are arranged in a non-overlapping state by the pins. Wash water sprayed from spray nozzles washes the tableware in the rack unit.

Also, the dishwasher may include an additional spoon stand to accommodate spoons or chopsticks. The spoon stand may have openings so that spoons or chopsticks are accommodated in the spoon stand in a state in which the spoons or the chopsticks are put through the openings.

SUMMARY

Additional aspects and/or advantages will be set forth in part in the description which follows and, in part, will be apparent from the description, or may be learned by practice of the invention.

In accordance with an aspect, a dishwasher may include a basket unit including a first basket to accommodate cutlery and a second basket to accommodate at least a portion of the first basket below the first basket, the second basket having second pins to support the cutlery, a frame to accommodate the basket unit, and a wash tub to accommodate the basket unit and the frame.

The first basket may have first pins to support the cutlery.

The first basket may include a plurality of the first baskets.

The second basket may include a plurality of the second baskets corresponding to the first baskets.

The second pins of the second basket may protrude above the bottom of the first basket through openings formed at the bottom of the first basket when the second basket accommodates the first basket.

The first basket may have a plurality of grips, and the first pins may be located between the grips.

The first basket may have a plurality of sides connected to the bottom of the first basket, and one of the sides of the first basket may be open.

One of the grips may be located at the open side of the first basket.

The second basket may have grip supports corresponding to the grips of the first basket.

The frame may accommodate only the first basket without the second basket, and the first basket may support the cutlery using the first pins.

The first basket may be provided at the bottom thereof with a slope from a predetermined point of one side to another side of the first basket, and the second basket may have openings provided so as to correspond to the slope of the first basket.

The second pins may protrude above the bottom of the first basket so that the second pins are higher than the first pins when the second basket accommodates the first basket.

A portion of the cutlery may be supported by the second pins and at least a portion of the remaining part of the cutlery may be supported by the first pins when the second basket accommodates the first basket.

The dishwasher may further include a guide to draw the frame, accommodating the basket unit, from the wash tub.

The frame may have basket supports, and the basket supports may be located below second grooves formed at a side of the second basket when the second basket is accommodated in the frame.

The first basket may have third pins, and the third pins may be provided at the open side of the first basket so as to be closer to the open side of the first basket than the second pins.

The third pins may be rotated to a predetermined angle from a bottom of the first basket.

The interval between the second pins corresponding to the third pins may be greater than the interval between the second pins corresponding to the first pins when the second basket accommodates the first basket.

The frame may accommodate the basket unit in a direction in which the basket unit is drawn out of the wash tub or in a direction perpendicular to the drawing direction.

The frame may accommodate only the first basket without the second basket in a direction in which the first basket is drawn out of the wash tub or in a direction perpendicular to the drawing direction.

In accordance with another aspect, a basket unit for dishwashers may include a first basket and a second basket to accommodate at least a portion of the first basket below the first basket, the second basket having second pins second pins protruding above the bottom of the first basket through openings formed at the bottom of the first basket to support cutlery.

The first basket may have first pins to support the cutlery.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
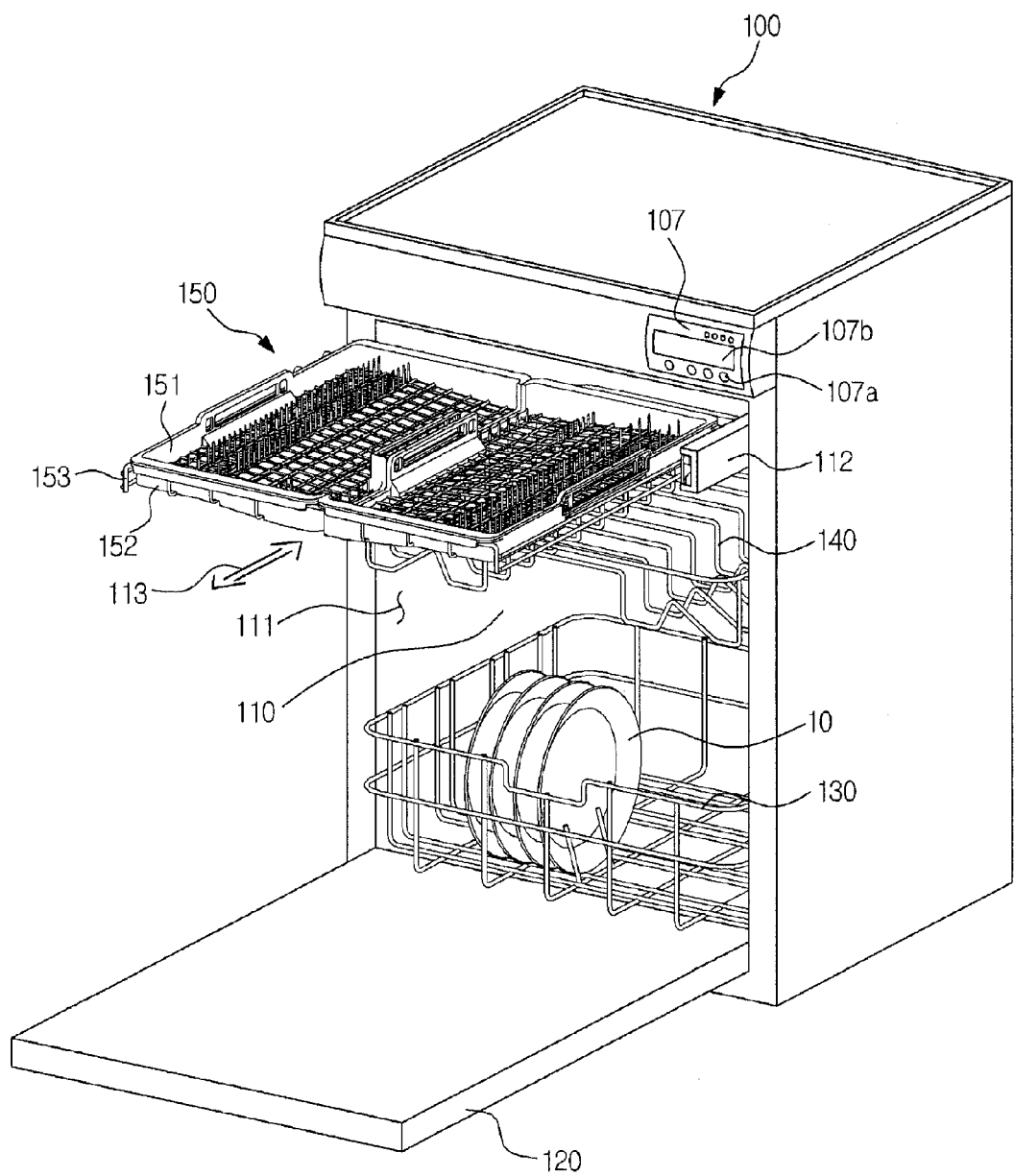
FIG. 1 is a view illustrating a dishwasher, in which a basket unit is mounted, according to an embodiment.

Reference will now be made in detail to the embodiments, examples of which are illustrated in the accompanying drawings, wherein like reference numerals refer to like elements throughout.

FIG. 1 is a view illustrating a dishwasher 100, in which a basket unit is mounted, according to an embodiment.

Referring to FIG. 1, the dishwasher 100 may include a wash tub 110, a door 120, a first rack unit 130, a second rack unit 140 and a rack unit 150.

The wash tub 110 is defined in the dishwasher 100. The wash tub 110 may have a predetermined capacity to accommodate tableware 10. For example, the capacity of the wash tub 110 may be indicated by volume—for example, cubic centimeters (cc), i.e. width (cm)×depth (cm)×height (cm), of the wash tub 110 or liters. The wash tub 110 may be provided at one side thereof with an opening 111 through which the first rack unit 130, the second rack unit 140 and the rack unit 150 may be inserted and drawn.

The door 120 may be mounted at the dishwasher 100 by a hinge (not shown) to open and close the opening 111 of the wash tub 110.

The wash tub 110 may include a plurality of wash water spray units (not shown). The wash water spray units may include a plurality of nozzles (not shown) to spray wash water—for example, water containing detergent—to wash various kinds of tableware 10, which are accommodated in the first rack unit 130, the second rack unit 140 and the rack unit 150.

The wash water spray units (not shown) may be mounted at the bottom, the side and/or the ceiling of the wash tub 110.

The wash water spray units (not shown) mounted at the bottom of the wash tub 110 may spray wash water upward. The wash water spray units (not shown) mounted at the side—for example, the side opposite to the opening 111, of the wash tub 110 may spray wash water upward or downward. The wash water spray units (not shown) mounted at the ceiling of the wash tub 110 may spray wash water downward.

The wash tub 110 may accommodate the first rack unit 130, the second rack unit 140 and the rack unit 150. The rack unit 150 may be disposed at the upper part of the wash tub 110. The second rack unit 140 may be disposed at the middle part of the wash tub 110. The first rack unit 130 may be disposed at the lower part of the wash tub 110.

In the wash tub 110 may be mounted guide rails 112 to support the first rack unit 130, the second rack unit 140 and the rack unit 150 and to guide the first rack unit 130, the second rack unit 140 and the rack unit 150 in directions 113 indicated by an arrow so that the first rack unit 130, the second rack unit 140 and the rack unit 150 are inserted into and drawn from the wash tub 110.

Hereinafter, the term 'support' means to support cutlery to be washed at the rack unit 150 so that the cutlery is easily washed or to divide a plurality of pieces of cutlery using pins.

Based on capacity and performance of the dishwasher 110, other rack units (not shown) may be mounted in the wash tub 110. Also, the first rack unit 130 and the rack unit 150 may be disposed in the wash tub 110 to have a two-step structure or the second rack unit 140 and the rack unit 150 may be disposed in the wash tub 110 to have a two-step structure.

Also, the rack unit 150 may be disposed at the lower part of the wash tub 110.

The first rack unit 130, the second rack unit 140 and the rack unit 150 may accommodate various kinds of tableware 10 to be washed. The tableware 10 may include, but is not limited to, cutlery—for example, table knives, forks, spoons, chopsticks, etc.—bowls, dishes and culinary tools—for example, kitchen knives, dippers, etc.

The cutlery may include table cutlery including forks, table knives, spoons and chopsticks and kitchen cutlery including kitchen knives and dippers. Hereinafter, cutlery may include table cutlery and/or kitchen cutlery.

The first rack unit 130 and the second rack unit 140 may accommodate cutlery which may be accommodated in the rack unit 150. Alternatively, the first rack unit 130 and the second rack unit 140 may accommodate tableware 10—for example, pots, frying pans or dishes—larger in volume or size than cutlery which may be accommodated in the rack unit 150.

The rack unit 150 may include an upper basket 151, a lower basket 152, a frame 153 and a guide (not shown).

Hereinafter, the upper basket 151 and the lower basket 152 may constitute a basket unit 150A. The basket unit 150A may further include an additional basket (not shown) in addition to the upper basket 151 and the lower basket 152. The additional basket (not shown) may be disposed above the upper basket 151, between the upper basket 151 and the lower basket 152 or below the lower basket 152.

The upper basket 151 may have first pins and/or third pins to support cutlery. For example, the upper basket 151 may have the first pins or the third pins. Alternatively, the upper basket 151 may have the first pins and the third pins.

The lower basket 152 may accommodate at least a portion of the upper basket 151—for example, the whole of the upper basket 151 or the bottom and side of the upper basket 151—below the upper basket 151 and may have second pins to support cutlery.

Also, the upper basket 151 and the lower basket 152 may have openings of various sizes through which wash water to wash cutlery passes.

The frame 153 may accommodate at least a portion of the lower basket 152, which accommodates at least a portion of the upper basket 151,—for example, the whole of the lower basket 152 or the bottom and side of the lower basket 152.

The dishwasher 100 may include a pump (not shown) to pump wash water, a wash water pipe (not shown) to allow the pumped wash water to flow to the wash water spray units (not shown) and a discharge port (not shown) through which wash water is discharged.

Figure 2:
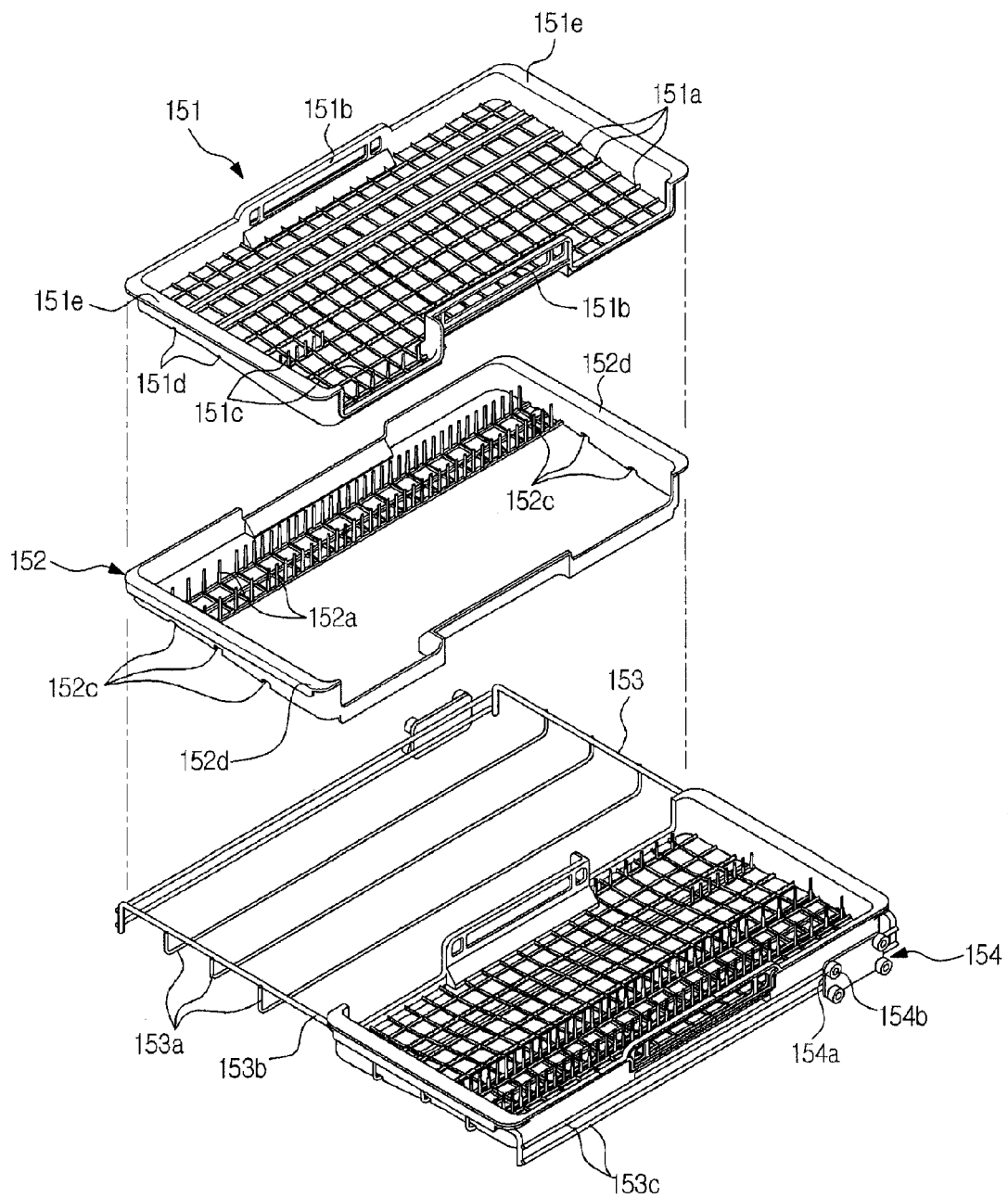
FIG. 2 is a view illustrating a rack unit of the dishwasher according to an embodiment.

FIG. 2 is a view illustrating a rack unit 150 of the dishwasher according to an embodiment.

Referring to FIG. 2, the rack unit 150 may include an upper basket 151, a lower basket 152, a frame 153 and a guide 154. The lower basket 152 may be located below the upper basket 151 to accommodate at least a portion of the upper basket 151.

The frame 153 may be located below the lower basket 152 to accommodate at least a portion of the lower basket 152.

The upper basket 151 may have a first extension 151e extending from at least one side 151f (see FIG. 4) of the upper basket 151. For example, the first extension 151e may be provided at one side, each of two sides, each of three sides and each of all sides of the upper basket 151.

The first extension 151e of the upper basket 151 may be placed on a second extension 152d of the lower basket 152 disposed below the upper basket 151. For example, the first extension 151e may be placed on one second extension 152d, each of two second extensions 152d, each of three second extensions 152d or each of four second extension 152d of the lower basket 152.

The first extension 151e may extend from the side 151f of the upper basket 151 at a predetermined angle—for example, an angle of 60 to 120 degrees.

Also, the upper basket 151 may have only the side 151f without the first extension 151e. The upper basket (not shown) having no first extension 151e may be accommodated in the lower basket 152.

A predetermined gap—for example, a gap of 5 mm—may be defined between the outside of the upper basket (not shown) having no first extension 151e and the inside of the lower basket 152.

The outside of the upper basket (not shown) having no first extension 151e may substantially contact the inside of the lower basket 152—for example, the gap between the outside of the upper basket (not shown) having no first extension 151e and the inside of the lower basket 152 may be 1 mm or less.

The predetermined gap may be changed depending upon the structure and size of the upper basket 151 and the lower basket 152.

The frame 153 may accommodate the upper basket 151 below the upper basket 151 without the lower basket 152.

The lower basket 152 may have a second extension 152d extending from at least one side 152e (see FIG. 5) of the lower basket 152. For example, the second extension 152d may be provided at one side, each of two sides, each of three sides and each of all sides of the lower basket 152.

The at least one second extension 152d of the lower basket 152 may be placed on the frame 153.

The second extension 152d may extend from the side 152e of the lower basket 152 at a predetermined angle—for example, an angle of 60 to 120 degrees—so that the second extension 152d is placed on the frame 153.

The second extension 152d may extend from the side 152e of the lower basket 152 at a predetermined angle—for example, an angle of 60 to 120 degrees—and may be bent from the extended end thereof at a predetermined angle—for example, an angle of 0 to 30 degrees—so as to cover at least a portion of the frame 153.

Also, the lower basket 152 may have only the side 152e without the second extension 152d. The lower basket (not shown) having no second extension 152d may be accommodated in the frame 153.

A predetermined gap—for example, a gap of 5 mm—may be defined between the outside of the lower basket (not shown) having no second extension 152d and the frame 153.

The outside of the lower basket (not shown) having no second extension 152d may substantially contact the frame 153—for example, the gap between the outside of the lower basket (not shown) having no second extension 152d and the frame 153 may be 1 mm or less.

The predetermined gap may be changed depending upon the structure and size of the lower basket 152 and the frame 153. Also, the predetermined gap may be set so that the lower basket 152 is separated from the frame 153, In a case in which the upper basket 151, which is accommodated in the lower basket 152 or the frame 153, includes a plurality of upper baskets—for example, a first upper basket 151A disposed at the left side of the opening 111 of the wash tub 110 and a second upper basket 151B disposed at the right side of the opening 111 of the wash tub 110—the upper baskets 151A and 151B may have substantially the same volume—for example, the difference of volume between the upper baskets 151A and 151B is 10 cc or less. Also, the opposite upper baskets 151A and 151B may not be symmetrical.

In a case in which only one lower basket 152, which accommodates the upper baskets 151A and 151B and is accommodated in the frame 153, is provided, the volume of the lower basket 152 may be greater than those of the upper baskets 151A and 151B.

In a case in which the lower basket 152, which accommodates the upper baskets 151A and 151B and is accommodated in the frame 153, includes a plurality of lower baskets—for example, a first lower basket 152A disposed at the left side of the opening 111 of the wash tub 110 and a second lower basket 152B disposed at the right side of the opening 111 of the wash tub 110, the lower baskets 152A and 152B may have substantially the same volume—for example, the difference of volume between the lower baskets 152A and 152B is 10 cc or less. Also, the opposite lower baskets 152A and 152B may be asymmetrical.

Also, the volume of the lower basket 152 may be greater than that of the upper basket 151 at least a portion of which is accommodated in the lower basket 152.

The frame 153 may include basket supports 153a, a first frame 153b and a second frame 153c.

The frame 153 may accommodate at least a portion of the lower basket 152, which accommodates at least a portion of the upper basket 151, using the basket supports 153a, the first frame 153b and the second frame 153c. Also, the frame 153 may accommodate at least a portion of only the upper basket 151 without the lower basket 152.

The guide 154 may be disposed at the side of the frame 153 so that the frame 153 is inserted into and drawn from the wash tub 110 through the opening 111 of the wash tub 110. The guide 154 may include a plurality of wheels 154a and a plurality of axles 154b corresponding to the wheels 154a.

The guide 154 may include a plurality of guides 154 disposed at one side of the frame 153.

The detailed structure of the upper basket 151 of the rack unit 150 will be described below with reference to FIG. 4.

The detailed structure of the lower basket 152 of the rack unit 150 will be described below with reference to FIG. 5.

Figure 3:
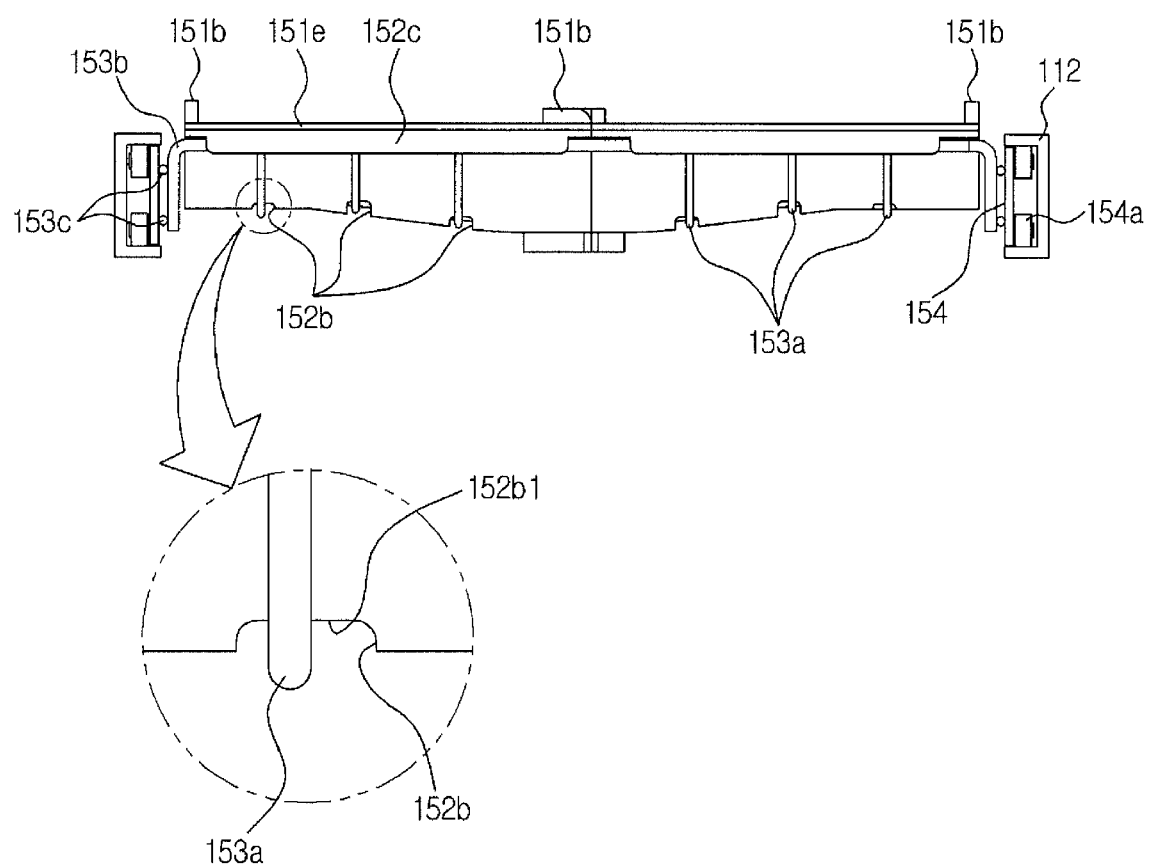
FIG. 3 is a front view of the rack unit according to an embodiment.

FIG. 3 is a front view of the rack unit according to the embodiment.

Referring to FIG. 3, the first extension 151e of the upper basket 151 may extend from the side 151f (see FIG. 4) of the upper basket 151 at a predetermined angle so that the first extension 151e of the upper basket 151 is placed on the second extension 152d of the lower basket 152.

The second extension 152d of the lower basket 152 may extend from the side of the lower basket 152 at a predetermined angle and may be bent at a predetermined angle so that the second extension 152d of the lower basket 152 is placed on the frame 153. The second extension 152d of the lower basket 152 may cover at least a portion of the frame 153.

The lower basket 152 may be provided at the side thereof with at least one second groove 152c.

The at least one second groove 152c may have a predetermined radius of curvature. In a case in which the at least one second groove 152c includes a plurality of second grooves 152c, the second grooves 152c may have different radii of curvature.

The frame 153 includes basket supports 153a, a first frame 153b and the second frame 153c.

The fame 153 may accommodate at least a portion of the upper basket 151 or the lower basket 152, which accommodates at least a portion of the upper basket 151.

The first extension 151e of the upper basket 151 or the second extension 152d of the lower basket 152 may be placed on the first frame 153b.

At least a portion of the first frame 153b of the frame 153 may be exposed out of the second extension 152d of the lower basket 152.

The guide 154 is fixed to the second frame 153c.

As shown in FIG. 2, each of the basket supports 153a may be formed in the shape of a rib parallel to the second frame 153c. The ribs may be parallel to the first frame 153b. The ribs may intersect the first frame 153b and the second frame 153c.

When the frame 153 accommodates the upper basket 151 or the lower basket 152, at least one basket support 153a may be located below the uppermost part 152b1 of at least one second groove 152c of the lower basket 152—for example, the highest point of the second groove 152c.

In a case in which the second extension 152d is not provided at the lower basket 152, the second grooves 152c of the lower basket 152 may be placed at the basket supports 153a of the frame 153—for example, the second grooves 152c of the lower basket 152 may contact the basket supports 153a of the frame 153.

In a case in which the first extension 151e is not provided at the upper basket 151, first grooves 151d of the upper basket 151 may be placed at the basket supports 153a of the frame 153—for example, the first grooves 151d of the upper basket 151 may contact the basket supports 153a of the frame 153.

The end of each grip 151b of the upper basket 151 may be formed at the highest position of the rack unit 150.

Referring to FIG. 3, the upper baskets 151A and 151B and the lower baskets 152A and 152B, which are accommodated in the frame 153, may be asymmetrical. Such asymmetry may be caused by grip gaps 151b1 (see FIG. 4) corresponding to the grips 151b of each of the upper baskets 151A and 151B located at the center of the frame 153. For example, the grip gaps 151b1 may be provided for a user to hold the grips 151b of each of the upper baskets 151A and 151B. Alternatively, the upper baskets 151A and 151B and the lower baskets 152A and 152B, which are accommodated in the frame 153, may be symmetrical. Such symmetry may be caused by a predetermined gap defined between the upper baskets 151A and 151B, which are accommodated in the frame 153. For example, the predetermined gap may be for a user to hold the grips 151b of each of the upper baskets 151A and 151B.

Figure 4:
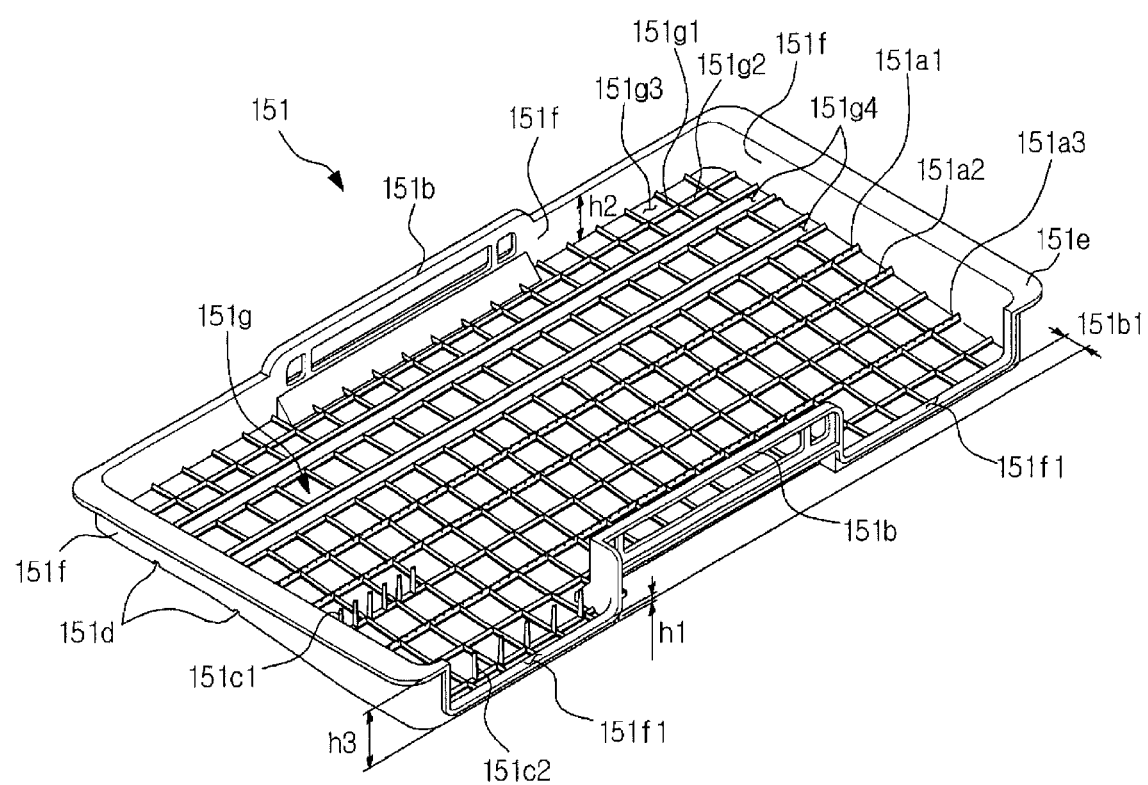
FIG. 4 is a view illustrating an upper basket according to an embodiment.

FIG. 4 is a view illustrating an upper basket according to an.

Referring to FIG. 4, the upper basket 151 may include first pins 151a, grips 151b, third pins 151c, first grooves 151d, a first extension 151e, a side 151f, an open side 151f1 and a bottom 151g.

The side 151f of the upper basket 151 may extend upwardly from the end of the bottom 151g at a predetermined angle—for example, an angle of 70 to 110 degrees.

The bottom 151g may include first wires 151g1, second wires 151g2 and first openings 151g3 defined by intersection of the first wires 151g1 and the second wires 151g2.

The first openings 151g3 may be defined by intervals at which the first wires 151g1 and the second wires 151g2 intersect.

Also, the bottom 151g may include second openings 151g4 defined by the second wires 151g2. The second pins 152a of the lower basket 152, which is located below the upper basket 151, may protrude above the bottom 151g of the upper basket 151 through the second openings 151g4.

The second openings 151g4 are provided at the bottom 151g of the upper basket 151 so that the second pins 152a of the lower basket 152 pass through the second openings 151g4. Additional fourth pins (not shown) of the lower basket 152 may protrude above the bottom 151g of the upper basket 151 through the second openings 151g4. Also, fifth pins (not shown) of an additional basket (not shown), which may be disposed between the upper basket 151 and the lower basket 152 or below the lower basket 152, may protrude above the bottom 151g of the upper basket 151 through the second openings 151g4.

Also, the bottom 151g may include second openings (not shown) defined by the first wires 151g1.

The side 151f may include the open side 151f1. The height h1 of the open side 151f1 may be lower than the minimum height h2 of the side based on the height of the first extension 151e. The height h1 of the open side 151f1 may be lower than the maximum height h3 of the side. More specifically, the height h1 of the open side 151f1 may be about 0.1 to 10 mm lower than the minimum height h2 of the side. Also, the height h1 of the open side 151f1 may be equal to the height of the bottom 151g of the upper basket 151.

Cutlery longer than the length between the grips 151b formed at the opposite sides of the upper basket 151 may be accommodated in the upper basket 151 using the open side 151f1 and the third pins 151c.

In a similar manner to the bottom 151g, the side 151f of the upper basket 151 may have widthwise wires (not shown), depthwise wires (not shown) and fifth openings (not shown) defined by intersection of the widthwise wires (not shown) and the depthwise wires (not shown).

The grips 151b may be provided at the respective sides 151f of the upper basket 151. The grips 151b may be provided at opposite sides 151f of the upper basket 151 so as to be parallel to the second wires 151g2 of the bottom 151g. The grips 151b may be provided at the opposite sides 151f of the upper basket 151 so as to be parallel to the first wires 151g1 of the bottom 151g. Also, the grips 151b may be provided at all the sides 151f of the upper basket 151.

The height of each of the grips 151b may be equal to or greater than the heights h2 and h3 of the first extension 151e based on the bottom 151g.

One of the grips 151b may be provided at the open side 151f1 of the upper basket 151. The grip 151b may be located at the middle of the open side 151f1.

The first pins 151a may be provided on at least some of the second wires 151g2 of the bottom 151g of the upper basket 151. Also, the first pins 151a may be provided on at least some of the first wires 151g1 of the bottom 151g of the upper basket 151.

Also, the first pins 151a may be provided on at least some of the first wires 151g1 and at least some of the second wires 151g2.

The first pins 151a may support cutlery—for example, heads 11a of spoons. For example, when the length of the spoons is shorter than the distance between the side 151f1 and first pins 151a2, the heads 11a of the spoons may be supported by first pins 151a1. When the length of the spoons is shorter than the distance between the side 151f1 and first pins 151a3, the heads 11a of the spoons may be supported by the first pins 151a1 and 151a2 or by the first pins 151a2. When the length of the spoons is longer than the distance between the side 151f1 and the first pins 151a3, the heads 11a of the spoons may be supported by the first pins 151a3.

The height of the first pins 151a1, 151a2 and 151a3 may be substantially the same—for example, the difference in height between the first pins 151a1, 151a2 and 151a3 may be 2 mm or less. Alternatively, the height of the first pins 151a1, 151a2 and 151a3 may be different.

The third pins 151c may be provided on at least some of the second wires 151g2 of the bottom 151g of the upper basket 151. The third pins 151c may support cutlery—for example, a grip 12c of a table knife 12. Also, the third pins 151c may support cutlery—for example, a grip 13c or an edge 13a of a kitchen knife 13.

The number of third pins 151c1 and 151c2 may be less than that of the first pins 151a1, 151a2 and 151a3. The height of the third pins 151c1 and 151c2 may be lower than that of the first pins 151a1, 151a2 and 151a3. The interval between the third pins 151c1—the distance between neighboring third pins 151c1—may be less than that of the third pins 151c2—the distance between neighboring third pins 151c2.

The bottom 151g of the upper basket 151 may have a slope. More specifically, the bottom 151g may slope from a predetermined point based on one side 151f—for example, shorter than the distance between one side 151f and the first pins 151a1—to an opposite side 151f at a predetermined angle—for example, an angle of 0.1 to 12 degrees based on the first extension 151e.

Alternatively, the bottom 151g may have a plurality of slopes. For example, the bottom 151g may slope to a predetermined point based on one side 151f—for example, shorter than the distance between one side 151f and the first pins 151a1—at a predetermined angle based on the first extension 151e—for example, an angle of 0.1 to 5 degrees and may slope from the predetermined point to an opposite side 151f at an angle of 12 degrees based on the first extension 151e. The predetermined angle may be measured using the bottom 151g and the side 151f.

Also, the slope may be provided so as to correspond to the size of cutlery supported by the respective pins 151a and 151c—for example, heads 11a, connections 11b and grips 11c of spoons 11.

The third pins 151c1 may be located between the first pins 151a1 and the first pins 151a2. The third pins 151c1 may be located between the first pins 151a1 and the first pins 151a3. Alternatively, the third pins 151c1 and 151c2 may be located between the first pins 151a1 and the first pins 151a3. Also, the third pins 151c1 and 151c2 may be provided so as to be opposite to the open side 151f1. The distance between the third pins 151c1 and 151c2 may be greater than that between the first pins 151a1 and 151a2.

The first grooves 151d may be formed at the side 151f of the upper basket 151. The first grooves 151d may correspond to the second grooves 152c of the lower basket 152. The first grooves 151d may be placed on the basket supports 153a of the frame 153.

The upper basket 151 may be made of a material which is formed by heating and/or pressing—for example, by heating, by pressing or by heating and pressing. The upper basket 151 may be made of a nonferrous metal or a metal.

Figure 5:
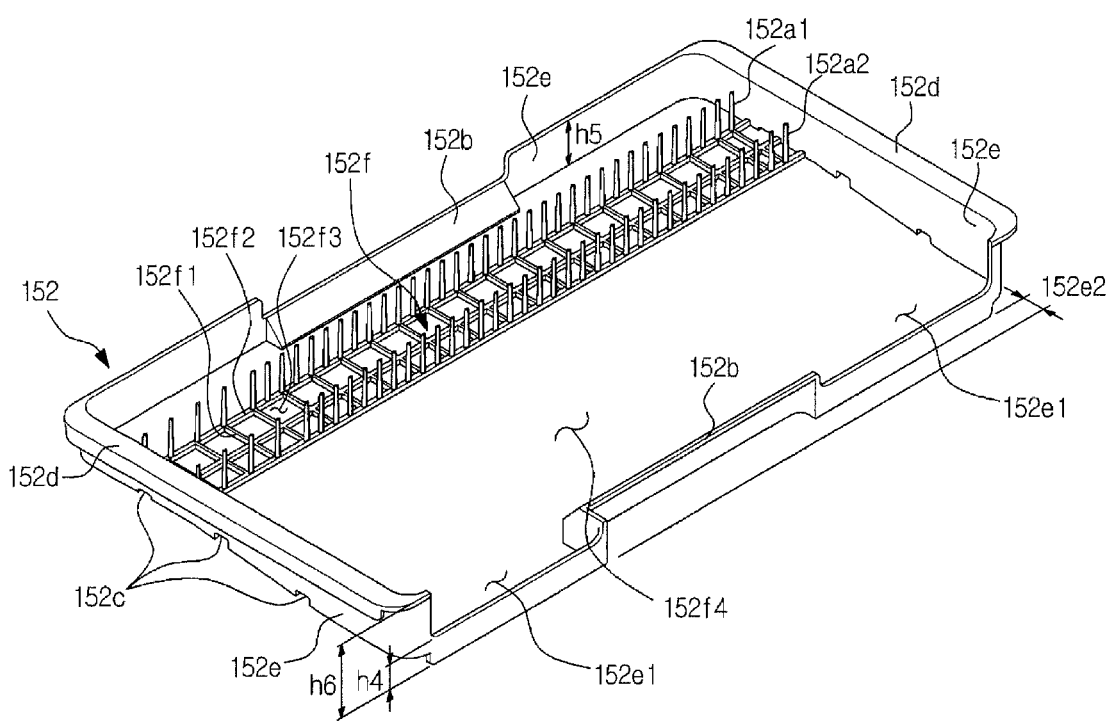
FIG. 5 is a view illustrating a lower basket according to an embodiment.

FIG. 5 is a view illustrating a lower basket according to an embodiment.

Referring to FIG. 5, the lower basket 152 may include second pins 152a, grip supports 152b, second grooves 152c, a second extension 151d, a side 152e, an open side 152e1 and a bottom 152f.

The side 152e of the lower basket 152 may extend upwardly from the end of the bottom 152f at a predetermined angle—for example, an angle of 70 to 110 degrees.

The bottom 152f may include first wires 152f1, second wires 152f2 and third openings 152f3 defined by intersection of the first wires 152f1 and the second wires 152f2. The first wires 152f1 and the second wires 152f2 may intersect to define the third openings 152f3.

Also, the bottom 152f may include fifth openings (not shown) defined by the second wires 152f2. Fifth pins (not shown) of an additional basket (not shown) may protrude above the bottom 151g of the upper basket 151 through the fifth openings (not shown).

The side 152e may include the open side 152e1. The height h4 of the open side 152e1 may be lower than the minimum height h5 of the side 152e based on the height of the first extension 152d. The height h4 of the open side 152e1 may be lower than the maximum height h6 of the side. The height h4 of the open side 152e1 may be about 0.1 to 10 mm lower than the minimum height h5 of the side. Also, the height h4 of the open side 152e1 may be equal to the height of the bottom 152f of the lower basket 152.

In a similar manner to the bottom 152f, the side 152e of the lower basket 152 may have widthwise wires (not shown), depthwise wires (not shown) and sixth openings (not shown) defined by intersection of the widthwise wires (not shown) and the depthwise wires (not shown).

The grip supports 152b may be provided at opposite sides 152e of the lower basket 152 so as to be parallel to the second wires 152f2 of the bottom 152f so that the grip supports 152b correspond to the grips 151b of the upper basket 151. The grip supports 152b may be provided at the opposite sides 152e of the lower basket 152 so as to be parallel to the first wires 152f1 of the bottom 152f.

Also, the grip supports 152b may be provided at all the sides 152e of the lower basket 152.

The height of each of the grip supports 152b may be less than the heights h5 and h6 of the second extension 152d. One of the grip supports 152b may be provided so as to correspond to the grips 151b formed at the open side 151f1 of the upper basket 151. The grip support 152b may be located at the middle of the open side 152e1.

The second pins 152a may be provided on at least some of the second wires 152f2 of the bottom 152f of the lower basket 152. Also, the second pins 152a may be provided on at least some of the first wires 152f1 of the bottom 152f of the lower basket 152.

Also, the second pins 152a may be provided on at least some of the first wires 152f1 and at least some of the second wires 152f2.

The second pins 152a may support cutlery—for example, grips 11b of spoons. For long cutlery supported by the second pins 152a and the third pins 151c—for example, a table knife 12, the second pins 152a may support a grip 12c of the table knife 12 and the third pins 151c may support a connection 12b of the table knife 12. A head 12a of the table knife 12 may be placed at the upper basket 151b neighboring to the upper basket 151A.

The number of second pins 152a1 and 152a2 may be less than that of the first pins 151a1, 151a2 and 151a3. The number of second pins 152a1 and 152a2 may be greater than that of the third pins 151c1 and 151c2.

The height of the second pins 152a1 and 152a2 may be higher than that of the first pins 151a1, 151a2 and 151a3. The height of the second pins 152a1 and 152a2 may be higher than that of the third pins 151c1 and 151c2.

The interval between the second pins 152a opposite to the open side 152e1—the distance between neighboring second pins 152a—may be greater than that of the second pins 152a opposite to the grip support 152b—the distance between neighboring second pins 152a.

The bottom 152f of the lower basket 152 may have a slope. The slope of the bottom 152f of the lower basket 152 may correspond to that of the bottom 151g of the upper basket 151.

The bottom 152f may slope from a predetermined point based on one side 152e—for example, longer than the distance between one side 151f and the second pins 152a1—to an opposite side 152e at a predetermined angle—for example, an angle of 0.1 to 12 degrees based on the second extension 152d.

Alternatively, the bottom 152f may have a plurality of slopes. For example, the bottom 152f may slope to a predetermined point based on one side 152e—for example, shorter than the distance between one side 152e and the second pins 152a1—at a predetermined angle based on the second extension 152d—for example, an angle of 0.1 to 5 degrees and may slope from the predetermined point to an opposite side 152e at an angle of 12 degrees based on the second extension 152d. The predetermined angle may be measured using the side 152e corresponding to the bottom 152f.

The bottom 152f of the lower basket 152 may have fourth openings 152f4 corresponding to the upper basket 151.

When the upper basket 151 is accommodated in the lower basket 152, the second pins 152a1 and 152a2 may protrude above the bottom 151g of the upper basket 151 through the second openings 151g4 of the upper basket 151.

The distance between the second pins 152a1 and the first pins 151a1 protruding above the bottom 151g of the upper basket 151 may be narrower than that between the second pins 152a1 and the third pins 151c1 protruding above the bottom 151g of the upper basket 151.

The interval between the second pins 152a corresponding to the third pins 151c may be greater than that of the second pins 152a not corresponding to the third pins 151c.

The second grooves 152c may be formed at the side 152e of the lower basket 152.

The second grooves 152c may correspond to the basket supports 153a of the frame 153. For example, the number of the basket supports 153a of the frame 153 may be equal to that of the second grooves 152c. The second grooves 152c may be placed on the basket supports 153a of the frame 153.

The number of the second grooves 152c may be greater than that of the first grooves 151d.

When the frame 153 accommodates the lower basket 152, at least one basket support 153a of the frame 153 may be located below the uppermost part 152b1 of at least one second groove 152c of the lower basket 152—for example, the highest point of the second groove 152c.

The lower basket 152 may be made of a material which is formed by heating and/or pressing—for example, by heating, by pressing or by heating and pressing. The lower basket 152 may be made of a nonferrous metal or a metal.

Figure 6:
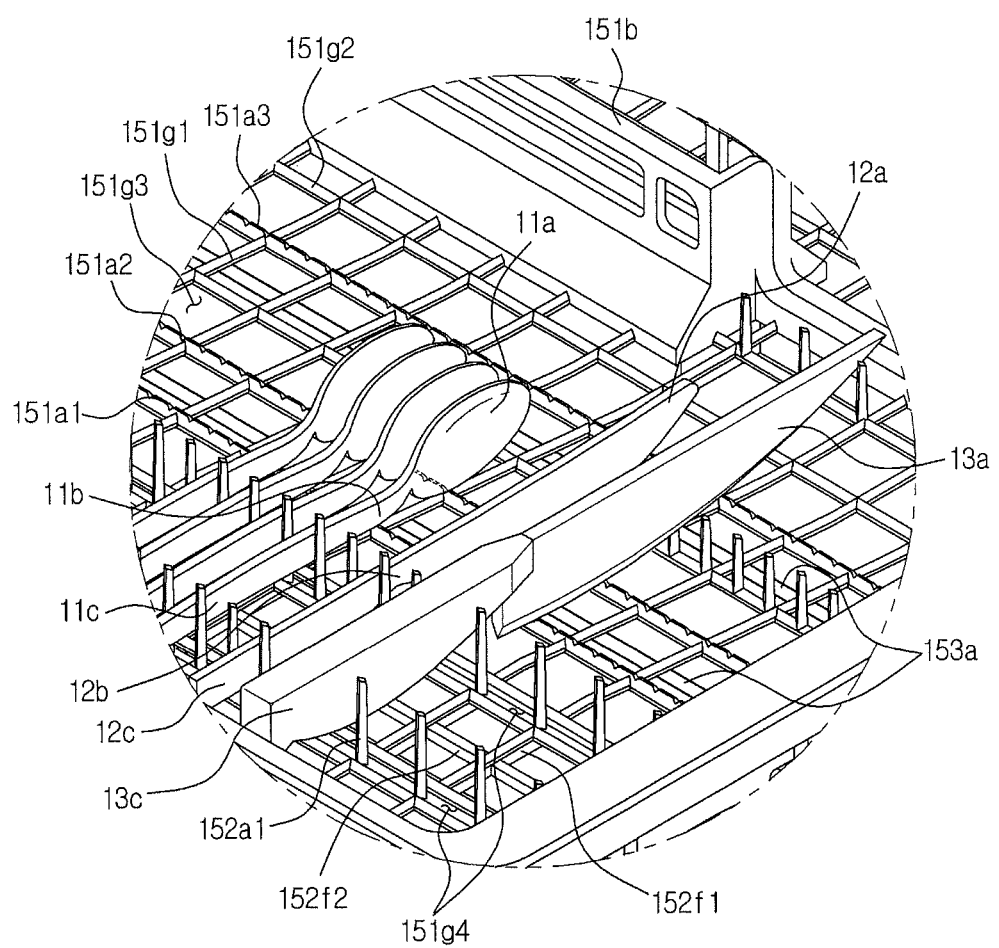
FIG. 6 is a view illustrating a basket unit, in which cutlery is placed, according to an embodiment.

FIG. 6 is a view illustrating a basket unit, in which cutlery is placed, according to an embodiment.

Referring to FIG. 6, there is shown cutlery—for example, spoons 11, a table knife 12 and a kitchen knife 13—placed in the upper basket 151 when the upper basket 151 is accommodated in the lower basket 152.

The first pins 151a of the upper basket 151 and the second pins 152a of the lower basket 152 may support the cutlery. The third pins 151c of the upper basket 151 and the second pins 152a of the lower basket 152 may support the cutlery.

The first pins 151a and the third pins 151c of the upper basket 151 and the second pins 152a of the lower basket 152 may support the cutlery.

The first pins 151a1, 151a2 and 151a3 of the upper basket 151 may support heads of the cutlery so as to correspond to the length or shape of the cutlery. For example, the heads 11a of the spoons 11 may be supported by only the first pins 151a1, by only the first pins 151a2, by only the first pins 151a3, by the first pins 151a1 and 151a2 by the first pins 151a1 and 151a3, by the first pins 151a2 and 151a3 or by the first pins 151a1, 151a2 and 151a3.

The second pins 152a of the lower basket 152 may upwardly protrude above the bottom 151g of the upper basket 151 through the second openings 151g4 of the upper basket 151 to support grips 11c of the spoons 11.

The basket supports 153a of the frame 153, which accommodates the upper basket 151 and the lower basket 152, may be disposed below the upper basket 151 and the lower basket 152.

Also, the basket supports 153a of the frame 153, which accommodates only the upper basket 151 without the lower basket 152, may be disposed below the upper basket 151.

Referring to FIG. 6, the grips 11c of the spoons may be supported by the second pins 152a1 and 152a2, and the heads 11a of the spoons may be supported by the first pins 151a2.

A grip 12c of the table knife 12 may be supported by the second pins 152a1 and 152a2, and a connection 12b of the table knife 12 may be supported by the third pins 151c1.

A grip 13c of the kitchen knife 13 may be supported by the second pins 152a1 and 152a2, and an edge 13a of the kitchen knife 13 may be supported by the third pins 151c1 and 151c2. Also, the edge 13a of the kitchen knife 13 may be supported by the first pins 151a and the third pins 151c1 and 151c2.

Figure 7:
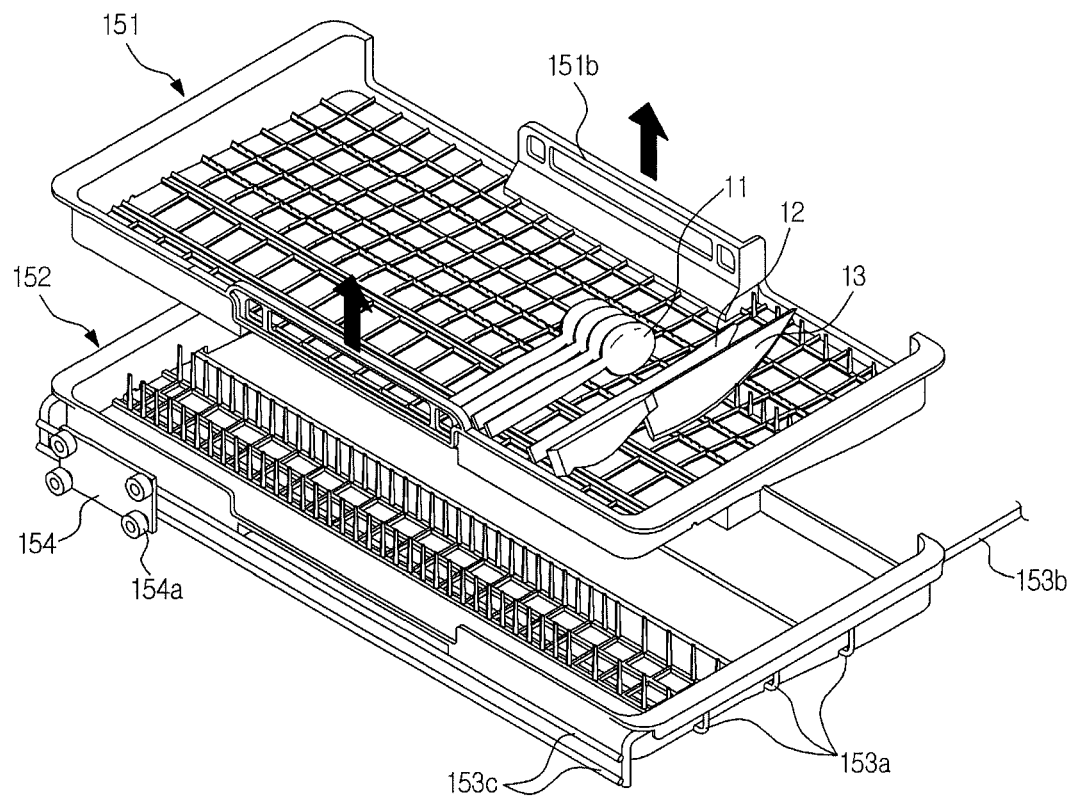
FIG. 7 is a view of the upper basket and the lower basket, which are separated from each other, according to an embodiment.

FIG. 7 is a view of the upper basket and the lower basket, which are separated from each other, according to an embodiment.

Referring to FIG. 7, a user may separate the upper basket 151 from the lower basket 152 using the grips 151b or the first extension 151e of the upper basket 151 after the rack unit 150 is drawn from the wash tub 110 of the dishwasher 100.

When the user separates the upper basket 151 from the lower basket 152—for example, lifts the upper basket 151 upward—the second pins 152a1 and 152a2 of the lower basket 152 downwardly pass through the second openings 151g4 of the upper basket 151.

When the upper basket 151 is separated from the lower basket 152, the lower basket 152 may remain accommodated in the frame 153.

A second posture of the cutlery items 11, 12 and 13 in FIG. 7—the posture of the cutlery items 11, 12 and 13 when the upper basket 151 is separated from the lower basket 152—may be different from a first posture of the cutlery items 11, 12 and 13 in FIG. 6—the posture of the cutlery items 11, 12 and 13 when the upper basket 151 is accommodated in the lower basket 152.

For example, at the first posture of the spoons, the heads 11a of the spoons 11 may be supported by the first pins 151a1, and the grips 11c of the spoons 11 may be supported by the second pins 152a1 and 152a2. At the second posture of the spoons, at least some of the heads 11a of the spoons 11 may be placed at the first pins 151a1 without the second pins 152a1 and 152a2.

Also, when the upper basket 151 is separated from the lower basket 152, long cutlery supported by the second pins 152a1 and 152a2 and the third pins 151c may be supported by the third pins 151c—for example, the third pins 151c1, the third pins 151c2 or the third pins 151c1 and 151c2—without the second pins 152a1 and 152a2.

When the upper basket 151 is separated from the lower basket 152, the cutlery in the upper basket 151 may easily be separated from the upper basket 151.

Also, the user may separate the basket unit 150A—the upper basket 151 and the lower basket 152—from the frame 153 using the second extension 152d of the lower basket 152, which accommodates the upper basket 151, after the rack unit 150 is drawn from the wash tub 110 of the dishwasher 100.

The user may separate the upper basket 151 from the lower basket 152 after separating the basket unit 150A.

When the upper basket 151 is separated from the lower basket 152, the cutlery in the upper basket 151 may easily be separated from the upper basket 151.

Figure 8:
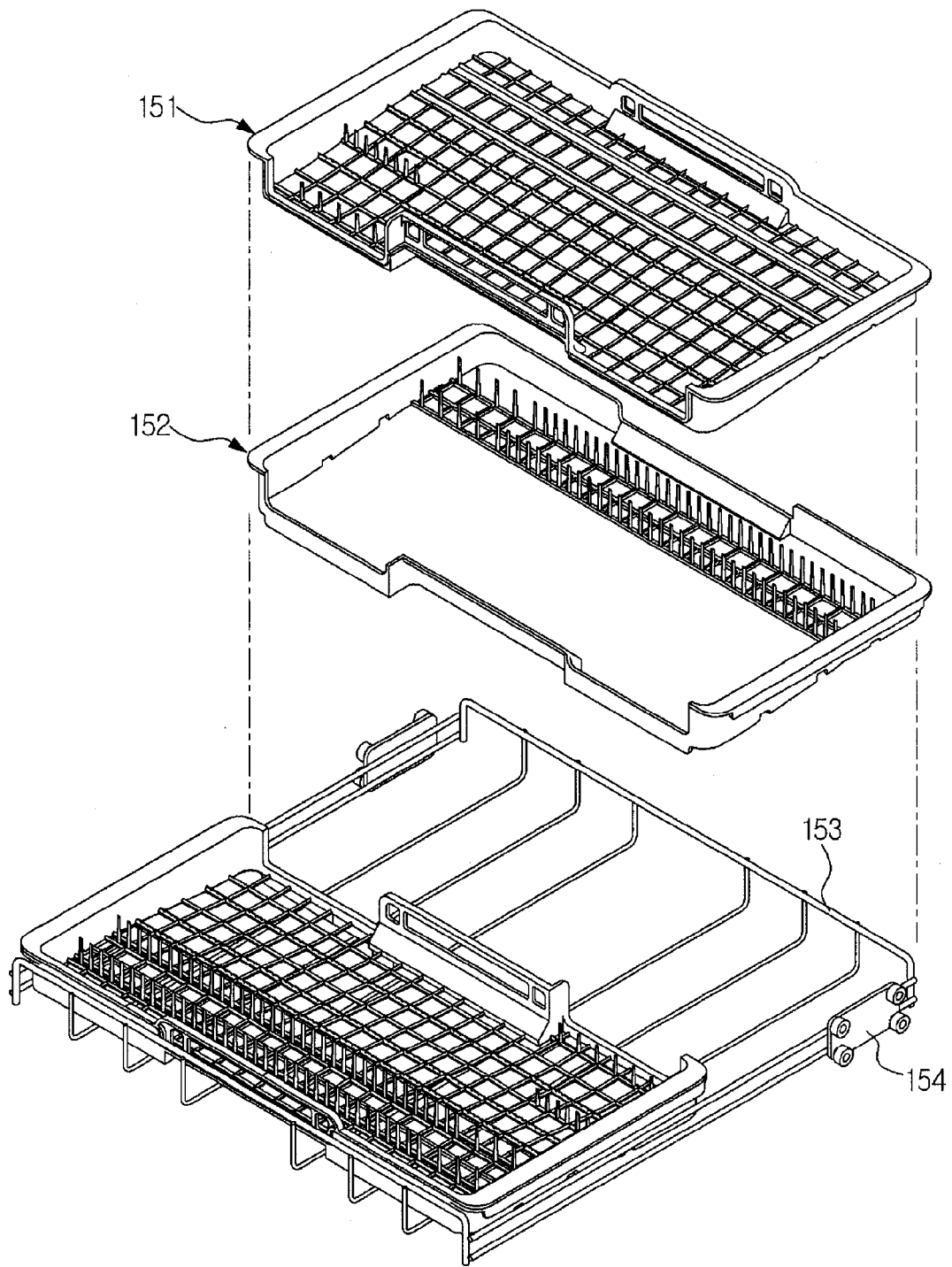
FIG. 8 is a view of a basket unit, the accommodation direction of which is changed, according to another embodiment.

FIG. 8 is a view of a basket unit, the accommodation direction of which is changed, according to another embodiment.

Referring to FIG. 8, the rack unit 150 may include an upper basket 151, a lower basket 152, a frame 153 and a guide 154.

The lower basket 152 may be located below the upper basket 151. The lower basket 152 may accommodate at least a portion of the upper basket 151 rotated 90 degrees from the opening 111 of the wash tub 110 in the counterclockwise direction as compared with the upper basket 151 of FIG. 2.

The frame 153 may be located below the lower basket 152. The frame 153 may accommodate at least a portion of the lower basket 152 rotated 90 degrees from the opening 111 of the wash tub 110 in the counterclockwise direction as compared with the lower basket 152 of FIG. 2.

The guide 154 may be provided at the side of the frame 153 so that the frame 153 is inserted into and drawn from the wash tub 110 through the opening 111 of the wash tub 110. A user may open the door 120 of the dishwasher 100 and draw the rack unit 150 from the wash tub 110 using the guide rails 112 before or after washing cutlery.

Referring to FIG. 1 or 2, when a user opens the door 120 of the dishwasher 100 and fully draws the rack unit 150 from the wash tub 110 in the drawing direction 113, the user may easily separate the upper basket 151 from the lower basket 152. For example, full drawing means that the upper basket 151—having two grips 151b—is separated from the lower basket 152 without interference with the ceiling of the wash tub 110. Also, full drawing means that the rack unit 150 is drawn a longer distance than the length of the second frame 153c from the wash tub 110.

Referring to FIG. 8, when a user opens the door 120 of the dishwasher 100 and draws the rack unit 150—including the basket unit 150A the loading direction of which is changed—from the wash tub 110 to a predetermined position in the drawing direction 113, the user may separate the upper basket 151 from the lower basket 152. For example, the predetermined position may be a position where the upper basket 151 is separated from the lower basket 152 without interference with the ceiling of the wash tub 110. Also, the predetermined position may be a first position outside the wash tub 110 shorter than the total length of the second frame 153c—for example, a position equivalent to 65 to 95% of the total length of the second frame 153c in the drawing direction 113 of the rack unit 150.

Also, the frame 153 may accommodate at least a portion of the upper basket 151 rotated 90 degrees from the opening 111 of the wash tub 110 in the counterclockwise direction without the lower basket 152.

Also, when the rack unit 150 is drawn to the predetermined position to separate the upper basket 151A, load applied to the guide 154 of the rack unit 150 may be reduced. For example, load applied to the guide 154 of the rack unit when the rack unit 150 is drawn to the predetermined position to separate the upper basket 151A and then the rack unit 150 is fully drawn to separate the upper basket 151B is different from load applied to the guide 154 of the rack unit when the rack unit 150 is fully drawn to simultaneously separate the upper baskets 151A and 151B.

Figure 9:
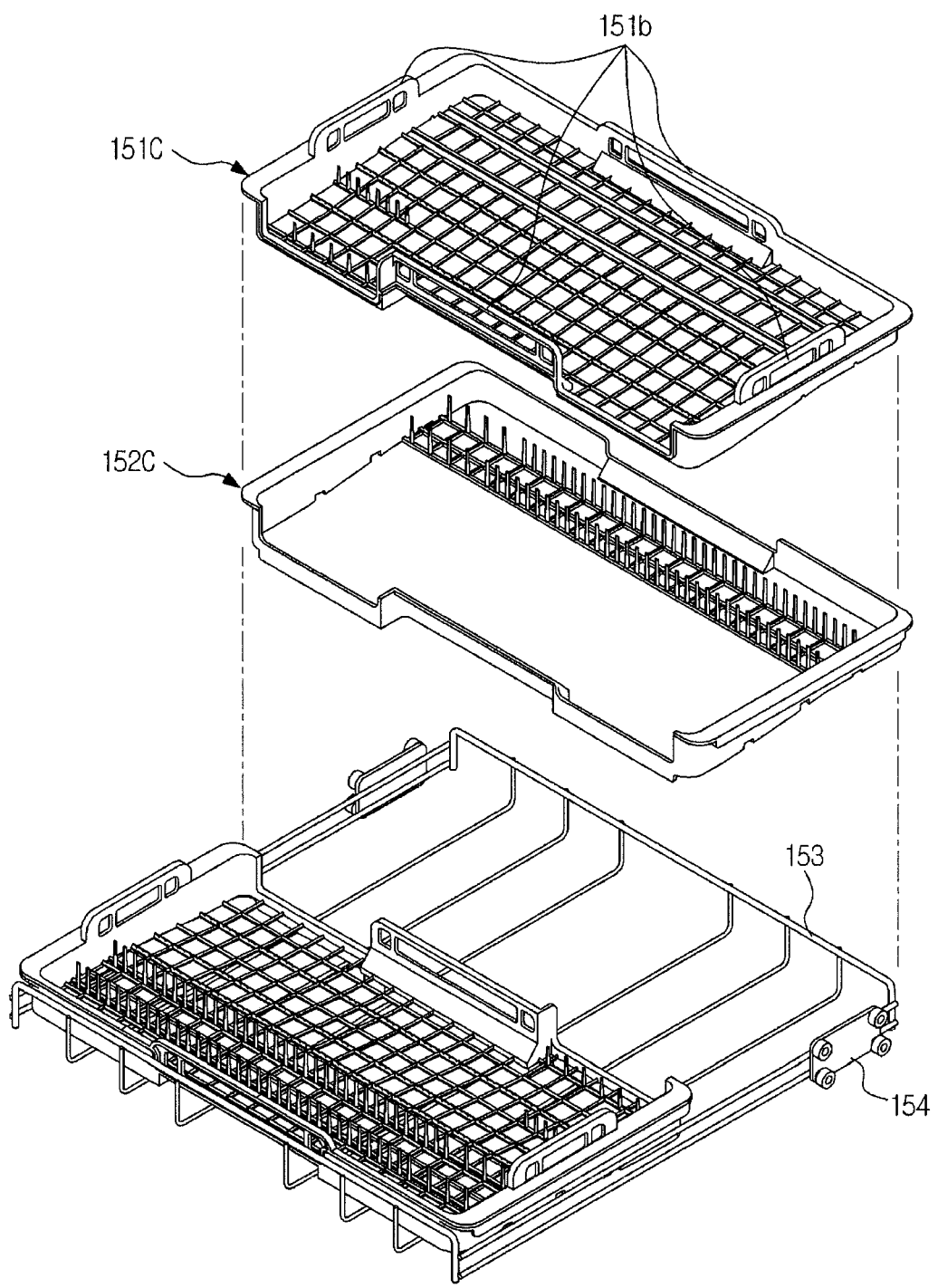
FIG. 9 is a view of a basket unit, the accommodation direction of which is changed, according to a further embodiment.

FIG. 9 is a view of a basket unit, the accommodation direction of which is changed, according to a further embodiment.

Referring to FIG. 9, the rack unit 150 may include an upper basket 151C having four grips 151b, a lower basket 152C, a frame 153 and a guide 154.

The lower basket 152C may be located below the upper basket 151C. The lower basket 152 may accommodate at least a portion of the upper basket 151C rotated 90 degrees from the opening 111 of the wash tub 110 in the counterclockwise direction as compared with the upper basket 151 of FIG. 2. The lower basket 152C may have grip supports 152b corresponding to the grips 151b of the upper basket 1510.

The frame 153 may be located below the lower basket 152C. The frame 153 may accommodate at least a portion of the lower basket 152C—accommodating at least a portion of the upper basket 1510—rotated 90 degrees from the opening 111 of the wash tub 110 in the counterclockwise direction as compared with the lower basket 152 of FIG. 2.

The guide 154 may be provided at the side of the frame 153 so that the frame 153 is inserted into and drawn from the wash tub 110 through the opening 111 of the wash tub 110.

A user may open the door 120 of the dishwasher 100 and draw the rack unit 150 from the wash tub 110 in the drawing direction 113 using the guide rails 112 before or after washing cutlery.

Referring to FIG. 1 or 2, when a user opens the door 120 of the dishwasher 100 and fully draws the rack unit 150 from the wash tub 110 in the drawing direction 113, the user may separate the upper basket 151—having two grips 151b—from the lower basket 152. For example, full drawing means that the upper basket 151 is separated from the lower basket 152 without interference with the ceiling of the wash tub 110. Also, full drawing means that the rack unit 150 is drawn a distance equivalent to the length of the second frame 153c from the wash tub 110.

Referring to FIG. 9, when a user opens the door 120 of the dishwasher 100 and draws out the rack unit 150—including the basket unit 150A the loading direction of which is changed—from the wash tub 110 to a predetermined position in the drawing direction 113, the user may separate the upper basket 151C from the lower basket 152C. For example, the predetermined position may be a position where the upper basket 151C is separated from the lower basket 152C without interference with the ceiling of the wash tub 110. Also, the predetermined position may be a first position outside the wash tub 110 shorter than the total length of the second frame 153c—for example, a position equivalent to 55 to 95% of the total length of the second frame 153c in the drawing direction 113 of the rack unit 150.

The user may separate the upper basket 1510 from the lower basket 152C using the grip 151b opposite to the opening 111 of the wash tub 110 or the grip 151*b* perpendicular to the grip 151*b* opposite to the opening 111.

Also, the frame 153 may accommodate at least a portion of the upper basket 151C, having four grips 151*b*, rotated 90 degrees from the opening 111 of the wash tub 110 in the counterclockwise direction without the lower basket 152C.

Figure 10:
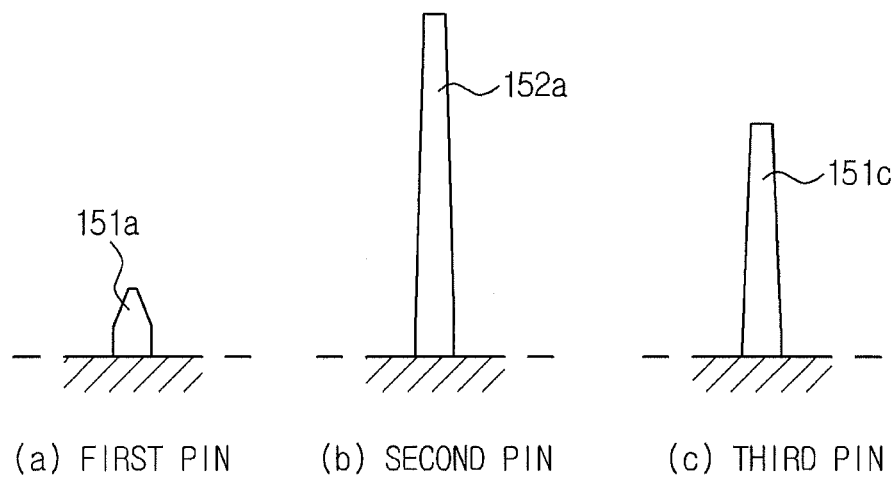
FIG. 10 is a view illustrating heights of first, second and third pins according to an embodiment.

FIG. 10 is a view illustrating heights of first, second and third pins according to an embodiment.

Referring to FIG. 10, there are shown heights of a first pin 151*a* and a third pin 151*c* disposed at the upper basket 151 and of a second pin 152*a* disposed at the lower basket 152.

The second pin 152*a* may have the maximum height and the first pin 151*a* may have the minimum height. The height of the second pin 152*a* may be higher than that of the third pin 151*c*. Also, the height of the second pin 152*a* may be equal to that of the third pin 151*c*.

The heights of the first pins 151*a*1, 151*a*2 and 151*a*3 may be different. For example, the height of the first pin 151*a*3 may be higher than those of the other first pins 151*a*1 and 151*a*2.

The heights of the second pins 152*a*1 and 152*a*2 may be different. For example, the height of the second pin 152*a*2 may be higher than that of the second pin 152*a*1. Alternatively, the height of the second pin 152*a*1 may be higher than that of the second pin 152*a*2.

The heights of the third pins 151*c*1 and 151*c*2 may be different. For example, the height of the third pin 151*c*2 may be higher than that of the third pin 151*c*1. Alternatively, the height of the third pin 151*c*1 may be higher than that of the third pin 151*c*2.

The respective pins 151*a*, 152*a* and 151*c* may have sections corresponding to the size of cutlery accommodated in the rack unit 150.

Figure 11:
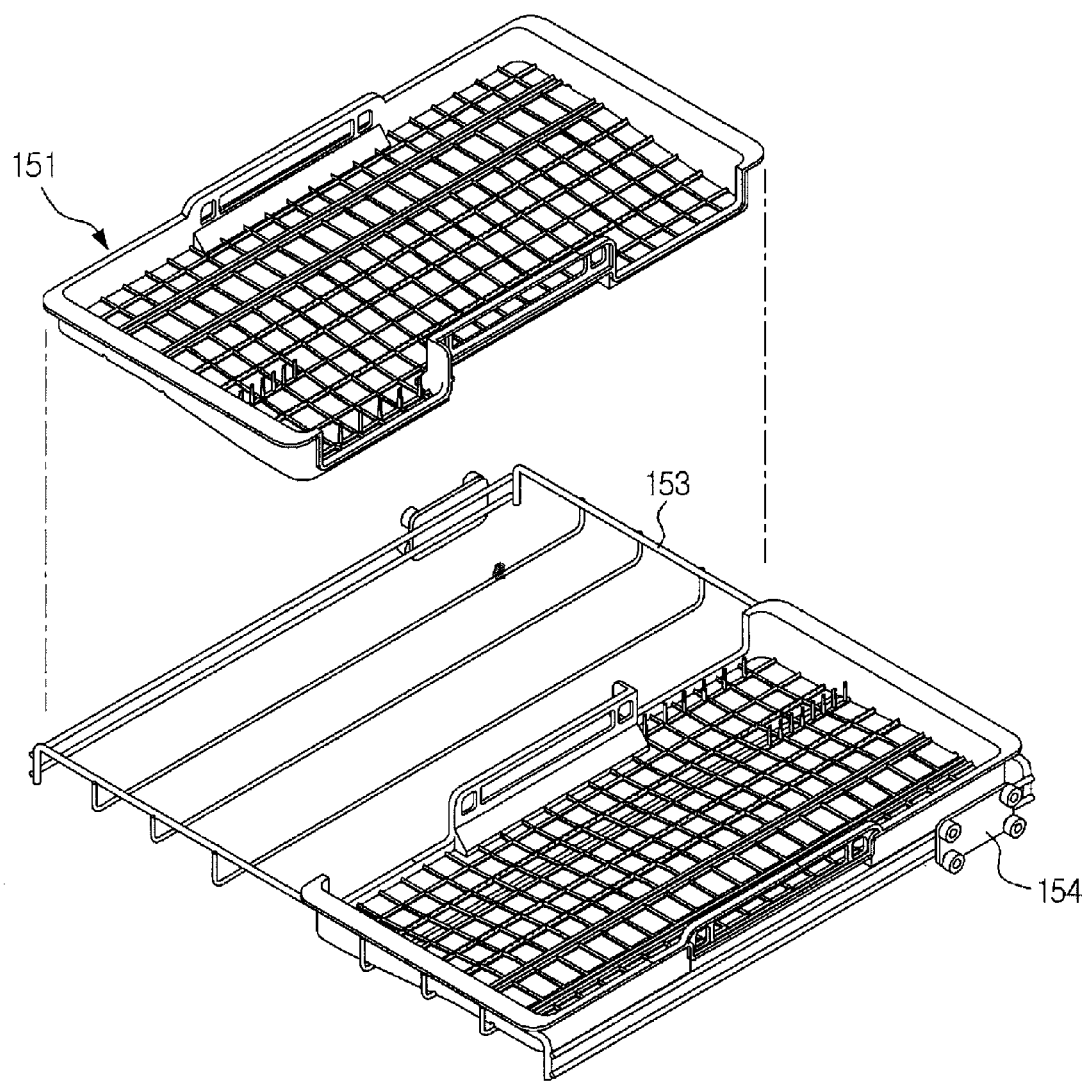
FIG. 11 is a view illustrating a rack unit to accommodate only the upper basket according to another embodiment.

FIG. 11 is a view illustrating a rack unit to accommodate only the upper basket according to another embodiment.

Referring to FIG. 11, the frame 153 may be located below the upper basket 151 and the lower basket 152 may be omitted. The frame may accommodate at least a portion of the upper basket 151.

The first extension 151*e* of the upper basket 151 may extend from the side 151*f* of the upper basket 151 at a predetermined angle so as to be provided on the frame 153.

The first extension 151*e* may be placed on the frame 153—for example, above only the first frame 153*b*, only the second frame 153*c* or both the first frame 153*b* and the second frame 153*c*. The first extension 151*e* may be placed on the frame 153 so as not to cover the first frame 153*b* or the second frame 153*c*.

When the frame 153 accommodates the upper basket 151, at least one basket support 153*a* of the frame 153 may be located below the uppermost part 151*d*1 of at least one first groove 151*d* of the upper basket 151—for example, the highest point of the first groove 151*d*.

Also, when the frame 153 accommodates at least a portion of the upper basket 151 having no first extension 151*e*, the first grooves 151*d* of the upper basket 151 may be placed at the basket supports 153*a* of the frame 153—for example, the first grooves 151*d* of the upper basket 151 may contact the basket supports 153*a* of the frame 153.

Also, the frame 153 may accommodate at least a portion of the upper basket 151 rotated 90 degrees from the opening 111 of the wash tub 110 in the counterclockwise direction without the lower basket 152.

Figure 12:
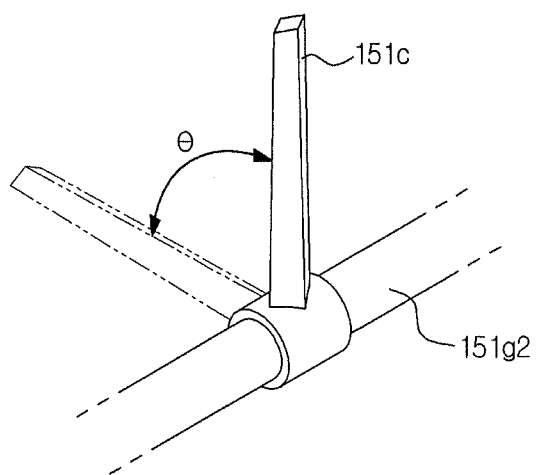
FIG. 12 is a view illustrating a rotatable third pin of the upper basket according to the embodiment.

FIG. 12 is a view illustrating a rotatable third pin of the upper basket according to an embodiment.

Referring to FIG. 12, the third pin 151*c* of the upper basket 151 may be rotated a predetermined angle θ with respect to the second wire 151*g*2.

For example, the predetermined angle may be an angle by which the third pin 151*c* is rotatable without contacting a neighboring left second wire 151*g*2 or a neighboring right second wire 151*g*2—for example, without rotation of a third pin 151*c*3 being limited.

The predetermined angle may be an angle by which rotation of the third pin 151*c* is limited by a stopper (not shown) provided at the second wire 151*g*2 at which the third pin 151*c*3 is provided—for example, rotation of the third pin 151*c* is limited to 90 degrees.

Also, the third pin 151*c*3 may slide in the longitudinal direction of the second wire 151*g*2 at which the third pin 151*c*3 is provided—for example, to a connection between the second wire 151*g*2 and the first wire 151*g*1.

Figure 13:
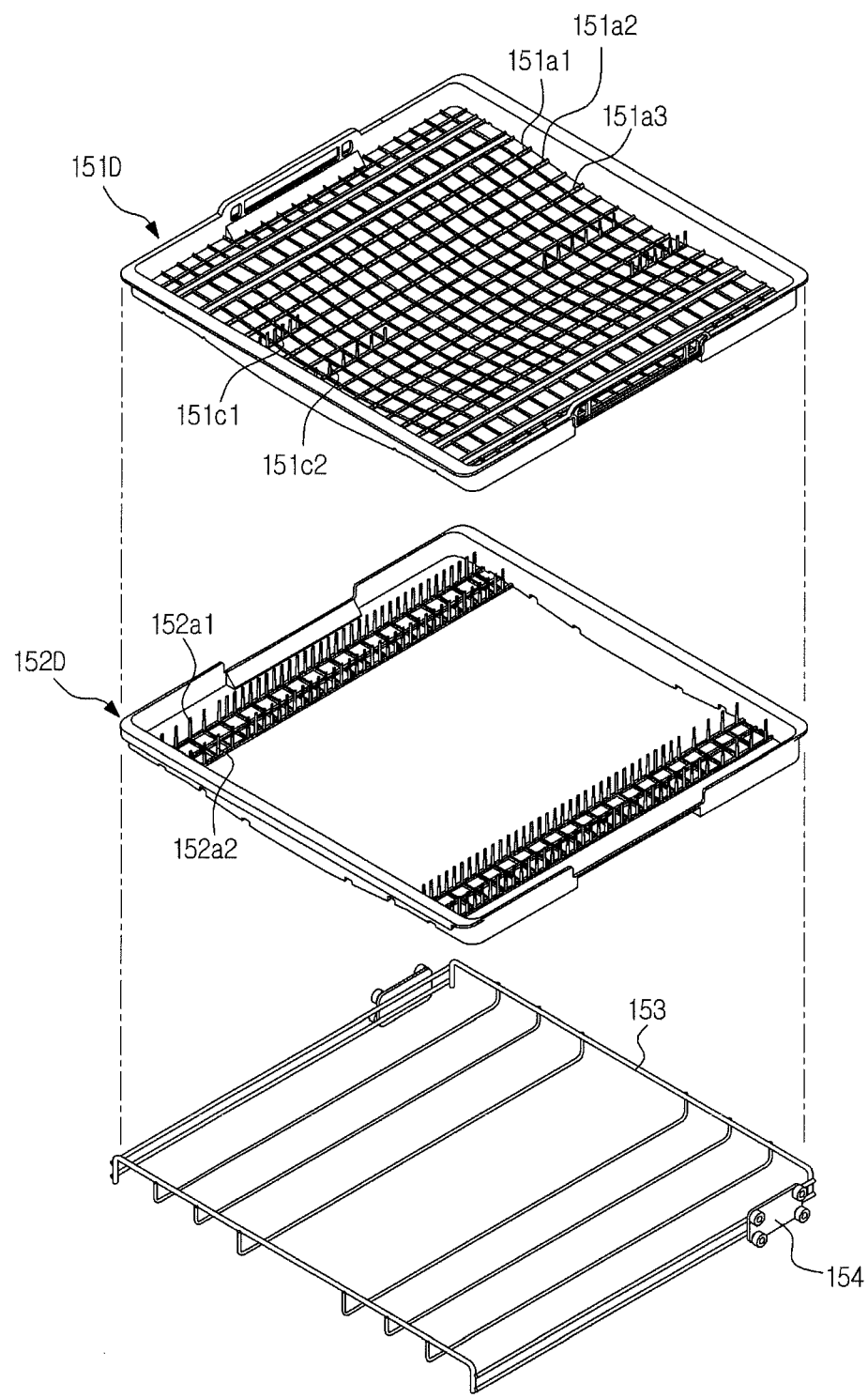
FIG. 13 is a view illustrating a rack unit of a dishwasher according to another embodiment.

FIG. 13 is a view illustrating a rack unit of a dishwasher according to another embodiment.

Referring to FIG. 13, the rack unit 150 may include an upper basket 151D, a lower basket 152D, a frame 153 and a guide 154.

The upper basket 151D may not have an open side 151*f*1 as compared with the upper basket 151 of FIG. 2. Also, the lower basket 152D may not have an open side 152*e*1 corresponding to the upper basket 151D.

At least one first extension 151*e* of the upper basket 151D may be placed on a second extension 152*d* of the lower basket 152D.

The frame 153 may accommodate at least a portion of the lower basket 152D, which accommodates at least a portion of the upper basket 151D.

At least one second extension 152*d* of the lower basket 152D may be placed on the frame 153.

The second extension 152*d* of the lower basket 152D may cover at least a portion of the frame 153. At least a portion of a first frame 153*b* of the frame 153 may be exposed out of the second extension 152*d* of the lower basket 152D.

Also, the lower basket 152D may be located below the upper basket 151D. The lower basket 152D may accommodate at least a portion of the upper basket 151D rotated 90 degrees from the opening 111 of the wash tub 110 in the counterclockwise direction.

The frame 153 may be located below the lower basket 152D. The frame 153 may accommodate at least a portion of the lower basket 152D, accommodating at least a portion of the upper basket 151D, rotated 90 degrees from the opening 111 of the wash tub 110 in the counterclockwise direction.

The guide 154 may be provided at the side of the frame 153 so that the frame 153 is inserted into and drawn from the wash tub 110 through the opening 111 of the wash tub 110.

Also, the frame 153 may accommodate at least a portion of the upper basket 151D without the lower basket 152D.

The frame 153 may accommodate at least a portion of the upper basket 151D rotated 90 degrees from the opening 111 of the wash tub 110 in the counterclockwise direction without the lower basket 152D.

Figure 14:
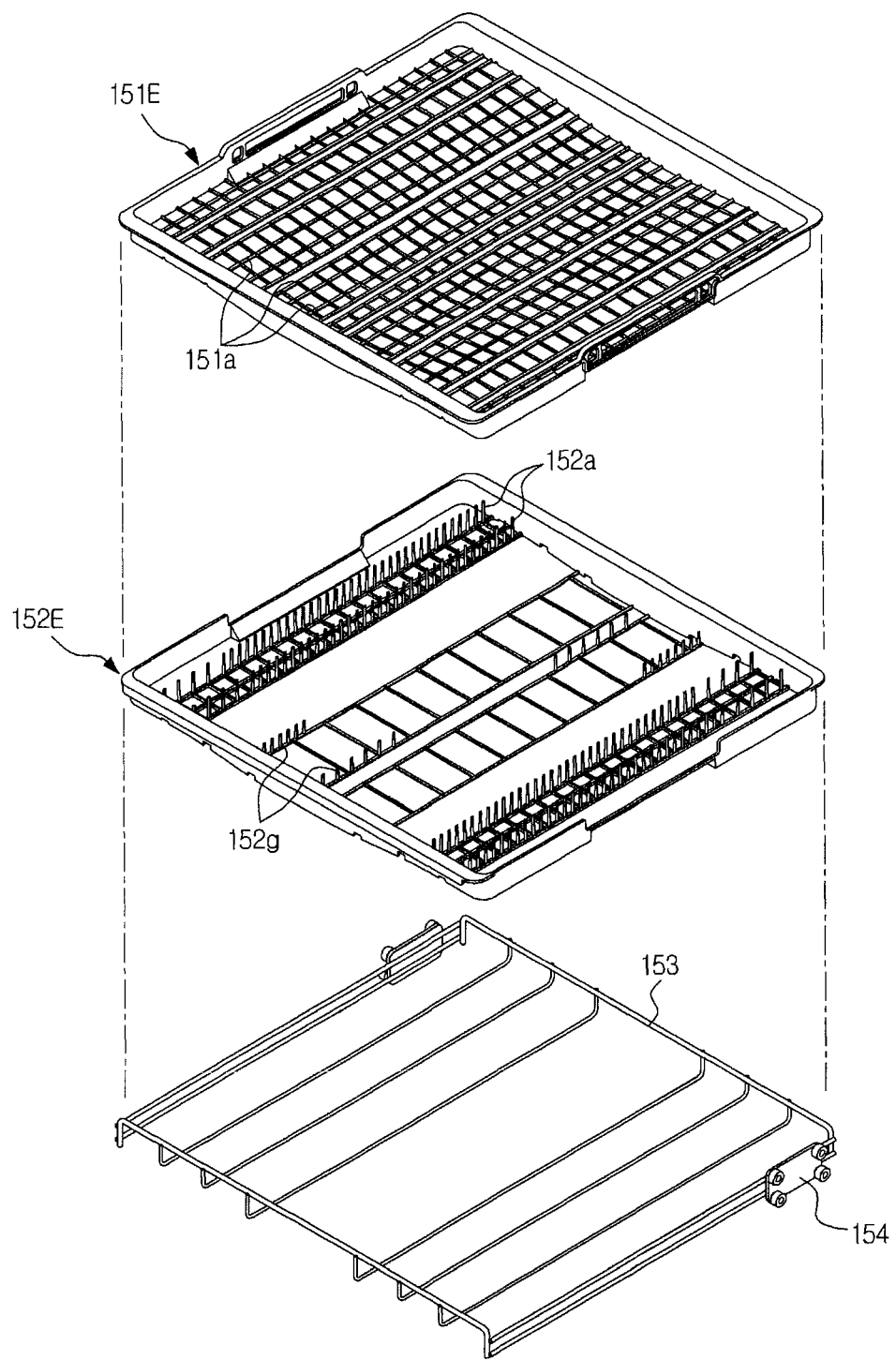
FIG. 14 is a view illustrating a rack unit of a dishwasher according to a further embodiment.

FIG. 14 is a view illustrating a rack unit of a dishwasher according to a further embodiment.

Referring to FIG. 14, the rack unit 150 may include an upper basket 151E, a lower basket 152E, a frame 153 and a guide 154.

The upper basket 151E may have a plurality of first pins 151*a* to support cutlery. The lower basket 152E may have a plurality of second pins 152*a* and third pins 152*g* to support cutlery. The upper basket 151E may include second openings 151g4 and sixth openings 151g5 defined by second wires 151g2.

The second pins 152a and the third pins 152g of the lower basket 152E, located below the upper basket 151E, protrude above the bottom 151g of the upper basket 151E through the second openings 151g4 and the sixth openings 151g5.

Also, the upper basket 151E may have no pins to support cutlery. The lower basket 152E may have second pins 152a, third pins 152g and first pins (not shown) to support cutlery so as to correspond to the upper basket having no pins.

The upper basket 151E may include second openings 151g4—corresponding to the second pins 152a—, sixth openings 151g5—corresponding to the third pins 152g—and seventh openings (not shown)—corresponding to the first pins (not shown)—defined by the second wires 151g2. The second pins 152a, the third pins 152g and the first pins (not shown) of the lower basket 152E, located below the upper basket 151E, may protrude above the bottom 151g of the upper basket 151E through the second openings 151g4, the sixth openings 151g5 and the seventh openings (not shown).

The frame 153 may accommodate at least a portion of the lower basket 152E, which accommodates at least a portion of the upper basket 151E.

At least one second extension 152d of the lower basket 152E may be placed on the frame 153. The second extension 152d of the lower basket 152E may cover at least a portion of the frame 153. At least a portion of a first frame 153b of the frame 153 may be exposed out of the second extension 152d of the lower basket 152E.

The lower basket 152E may be located below the upper basket 151E. The lower basket 152E may accommodate at least a portion of the upper basket 151E rotated 90 degrees from the opening 111 of the wash tub 110 in the counterclockwise direction.

The frame 153 may be located below the lower basket 152E. The frame 153 may accommodate at least a portion of the lower basket 152E, accommodating at least a portion of the upper basket 151E, rotated 90 degrees from the opening 111 of the wash tub 110 in the counterclockwise direction.

The guide 154 may be provided at the side of the frame 153 so that the frame 153 is inserted into and drawn from the wash tub 110 through the opening 111 of the wash tub 110.

Also, the frame 153 may accommodate at least a portion of the lower basket 152E rotated 90 degrees from the opening 111 of the wash tub 110 in the counterclockwise direction without the upper basket 151E.

As is apparent from the above description, embodiments provide a dishwasher wherein cutlery, accommodated in an upper basket, is easily separated from the upper basket using the upper basket and a lower basket to support the cutlery.

Also, embodiments provide a dishwasher wherein an upper basket is separated from a lower basket to easily separate cutlery, accommodated in the upper basket, from the upper basket.

Also, embodiments provide a dishwasher wherein loading directions of an upper basket and a lower basket are changed so that the upper basket and the lower basket are accommodated in a frame.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A dishwasher comprising:
a basket unit comprising a first basket to accommodate cutlery and a second basket disposed below the first basket to accommodate at least a portion of the first basket, the second basket having second pins to support the cutlery;
a frame to accommodate the basket unit; and
a wash tub to accommodate the basket unit and the frame,
wherein when the second basket accommodates the first basket the second pins of the second basket protrude above a bottom of the first basket through openings formed at the bottom of the first basket.

2. The dishwasher according to claim 1, wherein the first basket has first pins to support the cutlery.

3. The dishwasher according to claim 2, wherein the first basket comprises a plurality of the first baskets.

4. The dishwasher according to claim 3, wherein the second basket comprises a plurality of the second baskets corresponding to the first baskets.

5. The dishwasher according to claim 3, wherein
the first basket has a plurality of sides connected to a bottom of the first basket, and
one of the sides of the first basket is open.

6. The dishwasher according to claim 2, wherein
the first basket has a plurality of grips, and
the first pins are located between the grips.

7. The dishwasher according to claim 6, wherein one grip among the plurality of grips is located at the open side of the first basket.

8. The dishwasher according to claim 6, wherein the second basket has grip supports corresponding to the grips of the first basket.

9. The dishwasher according to claim 2, wherein the second pins protrude above a bottom of the first basket so that the second pins are higher than the first pins when the second basket accommodates the first basket.

10. The dishwasher according to claim 2, wherein the second pins are configured to support a portion of the cutlery and the first pins are configured to support at least a portion of the remaining part of the cutlery when the second basket accommodates the first basket.

11. The dishwasher according to claim 2, wherein
the first basket has third pins, and
the third pins are provided at an open side of the first basket so as to be closer to the open side of the first basket than the second pins.

12. The dishwasher according to claim 11, wherein the third pins are rotated to a predetermined angle from a bottom of the first basket.

13. The dishwasher according to claim 11, wherein an interval between the second pins corresponding to the third pins is greater than an interval between the second pins corresponding to the first pins when the second basket accommodates the first basket.

14. The dishwasher according to claim 1, wherein
the first basket is provided at a bottom thereof with a slope from a predetermined point of one side to another side of the first basket, and
the second basket has openings provided so as to correspond to the slope of the first basket.

15. The dishwasher according to claim 1, further comprising a guide to draw the frame, accommodating the basket unit, from the wash tub.

16. The dishwasher according to claim 15, wherein
the frame has basket supports, and
the basket supports are located below second grooves formed at a side of the second basket when the second basket is accommodated in the frame.

17. The dishwasher according to claim 1, wherein the frame accommodates the basket unit in a direction in which the basket unit is drawn out of the wash tub or in a direction perpendicular to the drawing direction.

* * * * *